April 4, 1961
F. FUGAZZA
2,978,357
PROCESS OF PROTECTIVELY COATING TUBULAR ELEMENTS
STRUCTURAL SHAPES AND THE LIKE WITH AT LEAST
ONE THERMOPLASTIC RESIN SHEATH
Filed June 17, 1958
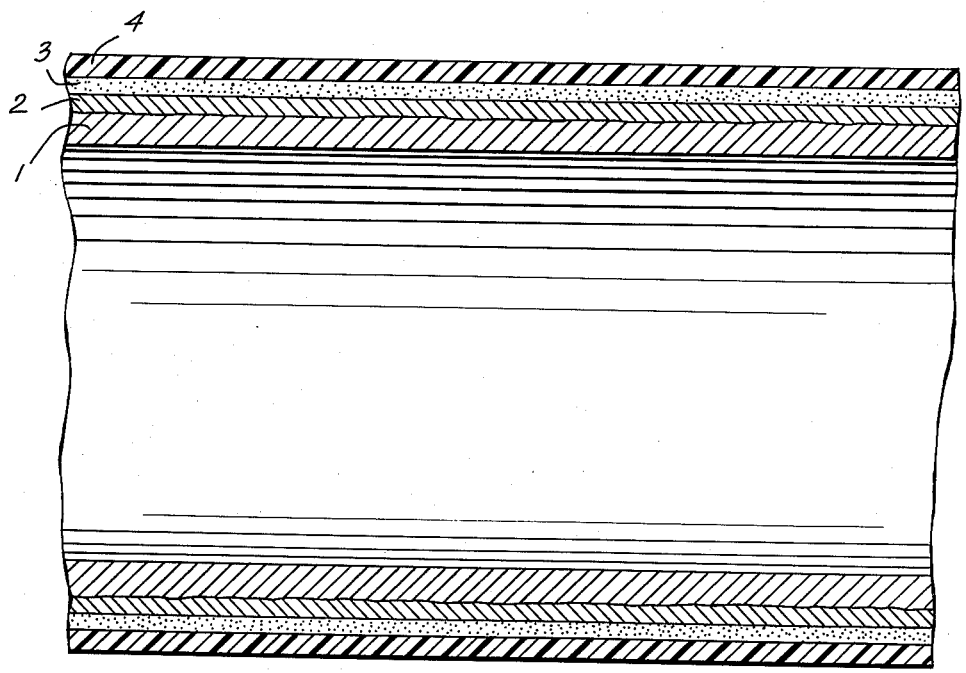
INVENTOR.
Francesco Fugazza
BY Michael J. Striker,
Attorney

United States Patent Office 2,978,357
Patented Apr. 4, 1961

2,978,357

PROCESS OF PROTECTIVELY COATING TUBULAR ELEMENTS, STRUCTURAL SHAPES AND THE LIKE WITH AT LEAST ONE THERMOPLASTIC RESIN SHEATH

Francesco Fugazza, Milan, Italy, assignor to Dalmine S.p.A., Milan, Italy

Filed June 17, 1958, Ser. No. 742,503

4 Claims. (Cl. 117—75)

The present invention relates to the production of tubes having protective coatings thereon.

Processes are known of coating structural bodies and particularly tubes with a synthetic resin sheath extruded from annular openings during the axial movement of the body. The sheath is drawn over the body moving with a greater speed than the sheath coming out of the die in such a manner that the pull produces a thinning of the thickness and a reduction in diameter, enabling, thanks also to the contraction due to cooling, the sheath to perfectly fit the body surface. The sheath is therefore only resting under pressure on the outer surface of the body and especially in the case of piping this causes the difficulty that, should a fault occur in the coating (by accidental causes during the transport or the production or the set up) water infiltrations develop which by capillarity diffuse along the metal surface of the tube, underneath the protective sheath.

Dangerous earthings form, therefore, through which a passage of stray currents of a high density takes place, given the limited surface of earth contact, the said currents causing within a short time the corrosion of the tube in the unprotected zone.

It is known that, in order to limit this inconveniency it has been proposed to have recourse to several protective layers, even of a different character, so as to prevent an eventual defect of the coating from exposing the metal surface; such a proceeding does not fully solve the problem in that the water penetrates between the first and second coating layer and may encounter a defective portion in the second layer and come in contact with the metal surface. It should be added that in the case of defects of the coating due to accidental causes of a mechanical character during transport and putting in place, the same affects both of the protective layers.

It is accordingly a primary object of the present invention to provide for the production of coated tubes whereby all of the above mentioned disadvantages are avoided.

It is another object of the present invention to provide protectively coated tubes wherein the coatings are without fault and wherein the coatings are permanently joined to the underlying tube.

Other objects and advantages of the present invention will be apparent from a further reading of the specification and of the appended claims.

With the above and other objects in view, the present invention mainly comprises a metallic tubular body having an outer roughened surface, a coating of a thermoplastic resin over the surface, and a layer of adhesive between and adhering to both the outer surface of the tubular body and the thermoplastic resin over the surface, and a layer of adhesive between and adhering to both the outer surface of the tubular body and the thermoplastic resin coating, intimately connecting the coating to the surface.

The process according to the present invention obviates the above-mentioned defects and is substantially characterized by the fact that between the metal surface of the body and the protective synthetic thermoplastic resin sheath there is disposed a layer of sticky material intended to intimately connect the protective layer to the underlying metal surface.

According to the invention, in the case of metal piping, the tubes may previously be coated with bitumen by immersion, so as to realize an efficacious protection from the isolating point of view.

The layer of bitumen, suitably heated, is smoothed, during the axial movement of the tube, by a calibrated ring arranged upstream of the extrusion zone of the protective sheath. Between the bitumen calibrating ring and the zone of sheath extrusion is applied under heat and calibrated the sticky layer causing the sheath to adhere to the bitumen coating. The sticky matter has a permanent viscosity and such a cohesion that an injury to the protective layer, within certain dimension limits, is automatically covered through a self adjustment of the sticky matter itself, so as to re-establish the continuity of the outer protective layer.

The sticky matter is preferably of the type consisting of a mixture of resinic acids (for instance, of the abietinic or pimaric type) in the proportion of about 27%; by a mixture of saturated fatty acids of the myristic, palmitic and/or similar type, with nonsaturated fatty acids having from 20 to 22 carbon atoms in the proportion of about 18%; and by oxidized bitumen (for instance, of the 100/110° C. firing point in the proportion of 55%). The mixture contains no volatile solvents.

The indicated percentages are, naturally, not restrictive and may vary between determinate limits without going outside of the scope of the present invention. It is understood that the process can be applied also to the case of more than one protective layer, with interposition between all or some of the surfaces, of sticky mixture.

The execution particulars of the present process may, of course, also vary with respect to what is described without going outside of the ambit of the invention.

Particularly, the metal surface to be coated may be subjected to a preliminary treatment adapted to increase the anchoring of the adhesive mixture (by pickling, sand blasting, parkerizing, peening etc.).

Further, two or more superposed sheaths may be applied, with interposed sticky layers interposed.

The novel features which are considered as characteristic for the invention are set forth in particular in the appended claims. The invention itself, however, will be best understood from the following description of specific embodiments when read in connection with the accompanying drawing in which the single figure illustrates a construction in accordance with the present invention.

Referring more particularly to the figure a metal tube 1 is provided with a layer of bitumen or tar 2 to which is applied a layer of adhesive 3 and on which is coated a layer of thermoplastic resin 4.

What is claimed as new and desired to be secured by Letters Patent is:

1. A protectively coated tube, comprising, in combination, a metallic tubular body having an outer roughened surface; a coating of a thermoplastic resin over said surface; and a layer of adhesive consisting essentially of a mixture of at least one resinic acid selected from the group consisting of abietic acid and primaric acid, at least one saturated fatty acid selected from the group consisting of myristic acid and palmitic acid, at least one non-saturated fatty acid of 20–22 carbon atoms, and oxidized bitumen between and adhering to both said outer surface of said tubular body and said thermoplastic resin coating intimately connecting said coating to said surface.

2. A protectively coated tube, comprising, in combination, a metallic tubular body having an outer roughened surface; a first coating of a substance selected from the group consisting of tar and bitumen adhering to said outer surface of said tubular body; a second coating of a thermoplastic resin over said first coating; and a layer of adhesive consisting essentially of a mixture of at least one resinic acid selected from the group consisting of abietic acid and pimaric acid, at least one saturated fatty acid selected from the group consisting of myristic acid and palmitic acid, at least one non-saturated fatty acid of 20–22 carbon atoms, and oxidized bitumen between and adhering to both said first coating and said second coating, whereby said second coating is intimately connected to said surface of said tubular body.

3. A protectively coated tube, comprising, in combination, a metallic tubular body having an outer roughened surface; a coating of a thermoplastic resin over said surface; and a layer of adhesive consisting essentially of a mixture of about 27% of at least one resinic acid selected from the group consisting of abietic acid and pimaric acid, at least one saturated fatty acid selected from the group consisting of myristic acid and palmitic acid, at least one non-saturated fatty acid of 20–22 carbon atoms, the total of saturated and unsaturated fatty acids being about 18%, and oxidized bitument in an amount of about 55% between and adhering to both said outer surface of said tubular body and said thermoplastic resin coating intimately connecting said coating to said surface.

4. A protectively coated tube, comprising, in combination, a metallic tubular body having an outer roughened surface; a first coating of a substance selected from the group consisting of tar and bitumen adhering to said outer surface of said tubular body; a second coating of a thermoplastic resin over said first coating; and a layer of adhesive consisting essentially of a mixture of about 27% of at least one resinic acid selected from the group consisting of abietic acid and pimaric acid, at least one saturated fatty acid selected from the group consisting of myristic acid and palmitic acid, at least one non-saturated fatty acid of 20–22 carbon atoms, the total of saturated and unsaturated fatty acids being about 18%, and oxidized bitumen in an amount of about 55% between and adhering to both said first coating and said second coating, whereby said second coating is intimately connected to said surface of said tubular body.

References Cited in the file of this patent

UNITED STATES PATENTS

| | | |
|---|---|---|
| 1,611,920 | Kenzbach | Dec. 28, 1926 |
| 1,802,605 | Kemp | Apr. 28, 1931 |
| 1,894,671 | Cox | Jan. 17, 1933 |
| 2,307,861 | Shapiro | Jan. 12, 1943 |
| 2,472,100 | Fair | June 7, 1949 |
| 2,787,557 | Christensen et al. | Apr. 2, 1957 |
| 2,881,093 | Buell | Apr. 7, 1959 |

FOREIGN PATENTS

| | | |
|---|---|---|
| 302,935 | Great Britain | Jan. 2, 1930 |